July 16, 1957 L. J. WUBBE 2,799,325
SEAT BACK ADJUSTING MEANS
Filed Feb. 8, 1954
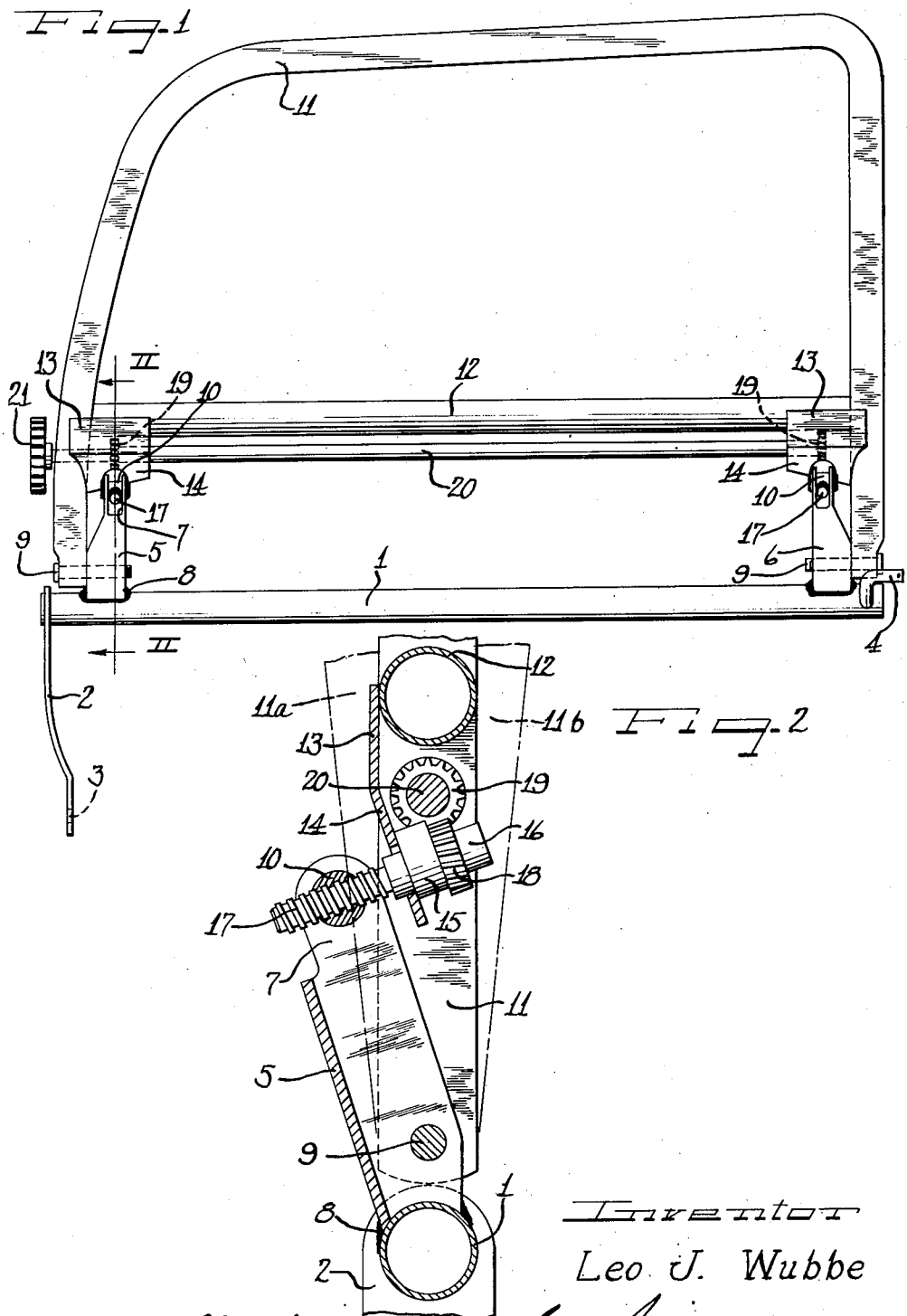
Inventor
Leo J. Wubbe

United States Patent Office 2,799,325
Patented July 16, 1957

2,799,325
SEAT BACK ADJUSTING MEANS

Leo J. Wubbe, Detroit, Mich., assignor to Houdaille Industries, Inc., a corporation of Michigan Application February 8, 1954, Serial No. 408,743

2 Claims. (Cl. 155—152)

This invention relates to improvements in seat back adjusting means, and more particularly to means for tilting the back of a seat to the particular angle desired by the occupant, the invention being highly desirable for use in connection with vehicle seats, although it may well be used in connection with chairs and the like in homes, offices, etc., and may have other uses and purposes as will be apparent to one skilled in the art.

Often times it is highly desirable, and in some instances almost essential, to be able to tilt the back of a seat to the angle most comfortable to the particular individual occupying the seat. This is especially true where a person sits in a chair for a reasonably long time, and particularly true when that person is riding in a vehicle such, for example, as an automobile.

In the past, many and various types of seat back adjusting means have been provided for furniture and the like, as well as for seats in vehicles such as airplanes and trains, but in no instance of which I am aware has any such back adjusting means been developed that is adaptable, sufficiently economical, and installable in a vehicle such as an automobile. Seats in automobiles and the like may be adjusted in several different directions insofar as the seat portion is concerned, the back moving therewith, but retaining the same angular relationship with the seat portion. Heretofore, if that particular angular relationship proved uncomfortable to an individual, nothing could be done about it, except by way of the use of extraneous elements such as pillows.

With the foregoing in mind, it is an important object of the instant invention to provide simple seat back adjusting means, by means of which the seat back may be separately adjusted by vary the angular relationship between the back and seat portion to the satisfaction of the occupant.

Another object of the invention resides in the provision of seat back adjusting means which may be quickly and efficiently operated, which are easy to install, and which may be incorporated in an automobile.

Also an object of the invention is the provision of seat back adjusting means so constructed as to be readily usable in connection with a seat equipped with a pivotal back, permitting an adjustment to be made and retained notwithstanding pivotal movement of the seat back when necessary.

Still another feature of the invention resides in the provision of a simple and economical seat back adjustment means highly desirable for incorporation in each individual back portion of the front seat of a two door automobile, the means being so constructed that the back may be tilted to vary the angle between it and the seat proper to the satisfaction of the occupant, and the entire back may be pivoted to permit a passenger to enter or leave the rear seat of the automobile, without in any manner disturbing the adjustment of the seat back.

While some of the more salient features, characteristics and advantages of the instant invention have been above pointed out, others will become apparent from the following disclosures, taken in conjunction with the accompanying drawing, in which—

Figure 1 is a front elevational view of the frame and supporting means for a seat back of the character utilized in connection with the front seat of a two door automobile; and Figure 2 is an enlarged fragmentary vertical sectional view taken substantially as indicated by the line II—II of Fig. 1, looking in the direction of the arrows.

As shown on the drawings:

While, as stated above, the instant invention may be incorporated in the back of substantially any seat, for purposes of convenience and clarity the invention is herein illustrated and described as associated with the individual back portion of a divided-back front seat of the character utilized in two door automobiles. It is obvious, of course, that the same device might be utilized upon a single back for an automobile seat, but where two or more passengers occupy that seat, the adjustment would be, of course, satisfactory in most cases to only one of the occupants.

The invention is associated with the frame structure of the seat back, and therefore except for the control element, may be totally concealed within the upholstery or covering of the seat back, if so desired.

In the illustrated embodiment of the instant invention, there is shown a frame and adjusting means for the right-hand section of a divided seat back for an automobile. Only the back, with all upholstery and covering removed, is herein illustrated.

The seat back frame includes a lower supporting rail or bar 1 to one end of which is fixed a depending arm 2 apertured near its lower extremity as indicated at 3 for the reception of a fixed pivot pin at a relatively low level. The opposite end of the frame bar 1 is provided with an offset pivot pin 4 engageable in a suitable bearing at a higher level. With this arrangement, the entire seat back may be pivoted forwardly and inwardly to an oblique position over the seat proper, as is common with front seat backs in two door automobiles.

Inside the pivot means but adjacent each end of the frame bar 1, are left and right-hand or allochiral brackets 5 and 6, each of which is of channel shape and provided with a bifurcated top portion as indicated at 7. The lower end of each bracket is welded or otherwise rigidly affixed to the frame bar 1, as indicated at 8. As seen best in Fig. 2, each bracket preferably is disposed at a forward angle relatively to a central perpendicular plane through the frame bar 1. Near its lower end, each bracket is apertured in its side flanges to accommodate a pivot pin 9. At its upper end, each bracket carries a trunnion nut 10 between bifurcations 7.

A top frame 11 having somewhat the shape of an inverted U is connected at its ends to the pivot pins 9—9. To insure adequate rigidity and strength, a fixed brace rod 12 extends between the legs of the frame 11. At each side of the frame a plate 13 is fixedly secured, as by welding, to both the adjacent frame leg and the brace rod 12. A rearwardly inclined depending portion 14 on each plate 13 has fixedly secured thereto a bearing 15 which journals a stub shaft 16 having an elongated threaded shank 17 engaged in the aforesaid trunnion nut 10. To the rear of the bearing the stub shaft 16 carries a helical gear 18 keyed to the shaft, and which is in mesh with a helical gear 19 secured to a shaft 20 journaled in the legs of the frame 11. Keyed to the outside end of the shaft 20, externally of the frame 11, is a control wheel 21 by means of which the shaft 20 may be manually rotated in either direction. This control wheel 21 will, of course, be outside any upholstery or covering on the seat back frame, so as to be readily accessible to the occupant of the seat.

In operation, the present invention is extremely simple. It is simply necessary for the occupant of the seat to reach down and turn the control wheel 21 in the desired direction. If this wheel and consequently the shaft 20 is rotated in one direction, the helical gears 19—19 adjacent opposite ends of the shaft 20 will rotate in unison, and actuate the threaded shanks 17—17 so they enter into the trunnion nuts 10—10 thus causing the entire frame 11 to move forwardly on the pivot pins 9—9, relatively to the base frame bar 1 and relatively to the seat proper to approach a different forward angle as indicated by position 11a shown in dotted lines in Fig. 2. Conversely, if the control wheel 21 is rotated in the opposite direction, the frame 11 will swing toward the rear and approach the rear position indicated in dotted lines at 11b in Fig. 2. By this simple mechanism, the seat back may be tilted forwardly or backwardly until the position most comfortable to the occupant is reached. Thereafter, the adjustment will remain as made until that occupant or another occupant again manipulates the control wheel 21.

It will be especially noted that the adjustment or tilt of the seat back remains the same, regardless of whether or not the entire seat back is pivoted or swung forwardly to permit an occupant to enter the rear seat of the automobile. It will be noted that there is a fixed connection between the plates 13—13 and the legs of the frame 11, and a rigid connection by virtue of the threaded shanks 17—17 engaging in the trunnion nuts 10—10, so that the whole frame portion including the upper part 11 and the base frame bar 1 may be swung forwardly and inwardly in unison about the pivot points 3 and 4, and when the entire seat back is returned to upright position, the previous tilting adjustment will be just the same as it was before.

From the foregoing, it is apparent that I have provided simple and positively operating mechanism for tilting a seat back to a position most comfortable to the occupant of the seat. The mechanism is simple, economical, easily installed, and when installed may be substantially entirely concealed except for a single control element by the covering of the seat back. Further, the mechanism does not interfere with other intended movements of the seat or seat back.

It will be understood that modifications and variations may be effected without departing from the scope of the novel concepts of the present invention.

I claim as my invention:

1. Seat back adjusting means, including a base bar, an upstanding bracket fixed to said base bar adjacent each end thereof, an upper back frame pivoted at its lower ends to lower parts of said brackets, trunnion nuts held by the upper parts of said brackets, a transverse shaft carried by said back frame, a threaded element on said back frame in engagement with each said nut, means on said shaft to actuate said elements in unison when the shaft is rotated, and a control member on said shaft and projecting to one side of said frame for rotating the shaft selectively in either direction.

2. Seat back adjusting means, including a pivotal base bar, an upstanding bracket fixed to said base bar adjacent each end thereof, a back frame pivoted at its lower ends to lower parts of said brackets, said back frame being capable of supporting a seat back, trunnion nuts carried by the upper parts of said brackets, a transverse shaft rotatably mounted in said back frame, a threaded element on said back frame in engagement with each said nut, gear means operatively connecting each threaded element to said transverse shaft, and a control member on one end of said shaft and to one side of said back frame, whereby adjustment between the base bar and the back frame may be made and retained notwithstanding pivotal movement of the seat back.

References Cited in the file of this patent

UNITED STATES PATENTS

| | | |
|---|---|---|
| 1,744,258 | Bitzenburger | Jan. 21, 1930 |
| 2,043,287 | Dorton | June 9, 1936 |

FOREIGN PATENTS

| | | |
|---|---|---|
| 29,270 | Sweden | June 27, 1908 |
| 42,252 | France | Mar. 28, 1933 |
| 1,014,458 | France | June 11, 1952 |